R. S. BLEVANS.
TRAP HEN'S NEST.
APPLICATION FILED APR. 12, 1912.
1,071,201. Patented Aug. 26, 1913.
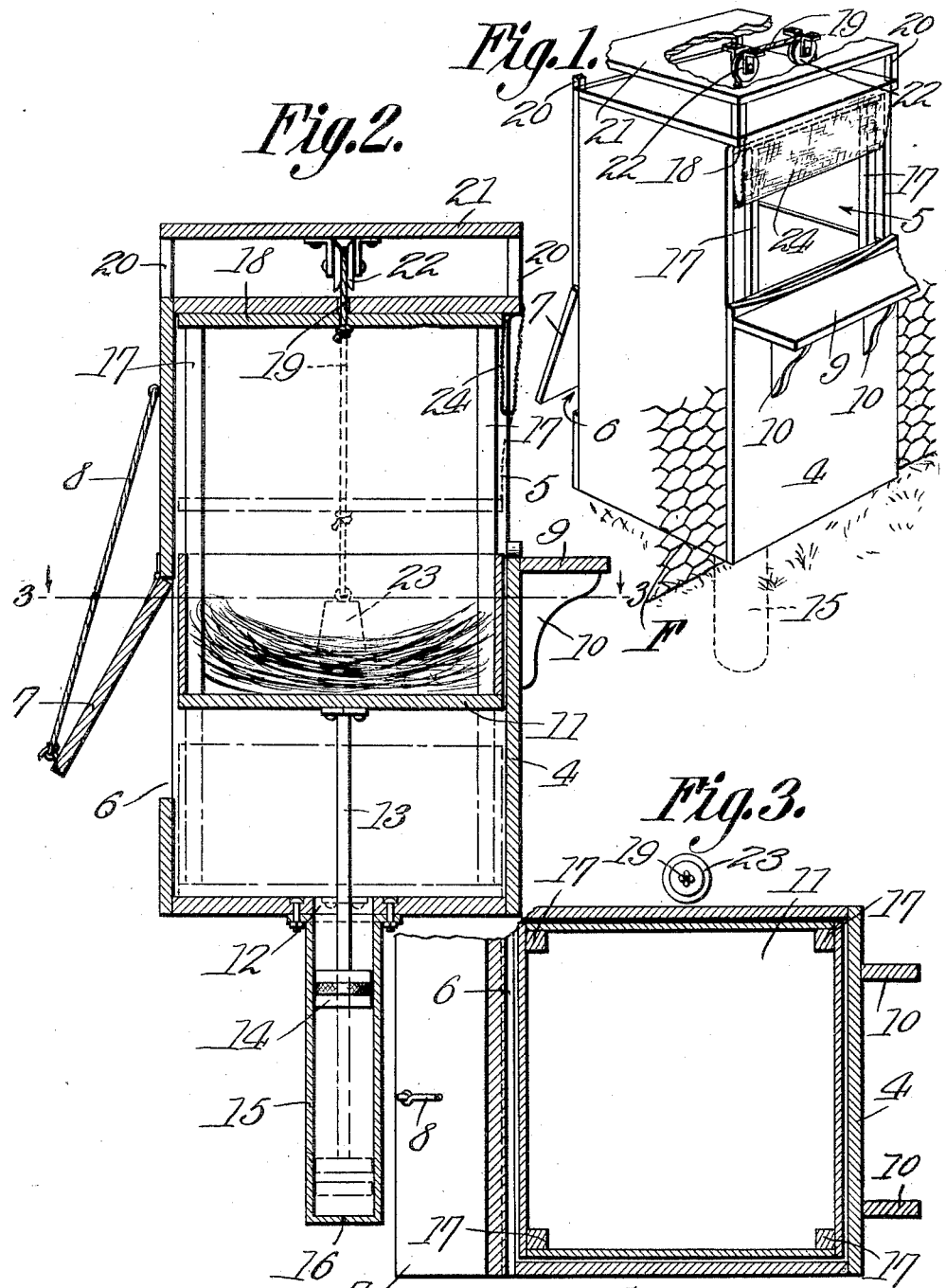
Witnesses
Richard S. Blevans, Inventor.
by C. A. Snow & Co.
Attorneys

UNITED STATES PATENT OFFICE.

RICHARD S. BLEVANS, OF VICTOR, COLORADO.

TRAP HEN'S NEST.

1,071,201.  Specification of Letters Patent.  Patented Aug. 26, 1913.

Application filed April 12, 1912. Serial No. 690,405.

*To all whom it may concern:*

Be it known that I, RICHARD S. BLEVANS, a citizen of the United States, residing at Victor, in the county of Teller and State of Colorado, have invented a new and useful Trap Hen's Nest, of which the following is a specification.

This invention relates to hens' nests.

It is one object of the present invention to provide a device of this character which may be built in a fence, wall or other partition separating two inclosures or poultry yards, and into which the hen may enter and which is operative to cause the hen to pass into the other inclosure or yard when the nest is vacated.

This invention has for another object the provision of a device of this character which may be readily occupied by the hen and which in its operation, will not frighten, excite or injure the hen, and which will permit the hen to remain therein in quietude and seclusion.

A further object of the present invention is to provide such a device which shall serve to convey the hens entering same from one inclosure or yard to an adjoining inclosure or yard, and shall prevent the hens from returning to the original inclosure or yard from which they came, thus segregating them completely from the others.

A still further object of the present invention is to provide a device of the character indicated which shall be simple, durable, and inexpensive in construction, and which shall be simple and effective in its operation.

This device is adapted particularly for use in segregating or separating the hens passing therethrough from the others in poultry yards, in order that the nesting hens may be distinguished or detected. The nonlaying hens may then be replaced by other laying hens and in this manner the efficiency of the poultry yard may be greatly increased, and the husbandry of the poultry yard may be brought to the highest possible standard, which is the desire of every poultry raiser. It is known that a good percentage of hens of every breed are not good laying hens, and it is therefore desirable to remove such hens from the flock and replace the same by laying hens With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in the accompanying drawings, in the preferred embodiment, and in which,—

Figure 1 is a perspective view of the device as in use, parts being broken away. Fig. 2 is a vertical section through the device, on a slightly enlarged scale. Fig. 3 is a sectional view taken on the line 3—3 of Fig. 2, parts being broken away.

Referring specifically to the drawings, wherein similar numerals have been used to designate corresponding parts, the numeral 4 designates the casing, which is preferably rectangular in cross section, and which has an upper entrance 5 through the front wall thereof, and which has a lower exit 6 through the opposite or rear wall thereof. The entrance 5 extends to the sides of the casing in one direction and extends from the top of the casing to a position slightly above the median plane between the top and bottom of the casing in the other or vertical direction, and the upper end of the exit 6 is arranged slightly below the lower end of the entrance 5, this exit 6 extending to the sides of the casing and having its lower end spaced above or terminating short of the bottom of the casing. It is understood, however, that the particular location, form or size of the entrance or exit may be altered as is deemed desirable or necessary.

The vertically slidable nest has been designated by the numeral 11, this nest being in the form of a rectangular box, containing feathers, straw, or similar material as are commonly employed in nests of this character, this nest being of a contour to fit snugly within the casing and being free to slide vertically therein. Struts 17 are secured within the corners of the nest or box 11, and have their upper ends upstanding from the corners of the nest, a false top 18 being secured to the upper ends of the struts, and which false top 18 is of a contour similar to nest and which is seatable against the top of the casing when the nest is raised. The false top 18 is spaced at a suitable distance above the nest 11 so that when the false top 18 is seated against the top of the casing, the upper end of the nest will be flush with the lower end of the entrance 5, although if desired, the upper end of the nest may be slightly spaced above or below, the lower end of the entrance when the nest is raised. The nest when lowered is adapted to seat on the bottom of the casing, and in so doing, moves to a position slightly below the exit, thereby carrying the false top 18 downward, which will close the passage from the nest through the entrance 5. This false top 18, when the nest is seated on the bottom of the casing, is adapted to assume a position slightly above the lower end of the entrance 5 for the purpose hereinafter set forth, and the side of the nest 11 adjacent the exit 6 is arranged to have its upper edge protrude slightly above the lower end of the exit 6 when the nest is lowered or depressed for the purpose hereinafter described.

The nest is normally held in raised position by means which overbalances the weight of the nest, this means for overbalancing the weight of the nest consists in a weight 23 arranged at one side of the casing and connected by a cord or cable 19 to the false top 18. This cable 19 passes through the top of the casing and is trained over the pulleys or sheaves 22 which are mounted below a canopy 21. This canopy 21 is supported above the top of the casing by means of standards 20 at the corners. The weight 23 is sufficient to overbalance the weight of the nest 11 and accompanying parts, so that when the nest is unoccupied the same will be raised to bring the false top 18 against the top of the casing. The weight 23, however, is not sufficient to retain the nest in raised position when occupied, and as a result the nest will gravitate within the casing.

When the nest is occupied by a hen, the nest is restricted to gravitate slowly and gradually, this result being accomplished by means of an air cylinder 15, secured at its upper end to the bottom of the casing, around an opening provided therein, and having the lower end thereof closed and provided with a constricted vent 16, a solid piston 14 working in the cylinder 15, and a piston rod 13 secured at its ends to the piston 14 and to the bottom of the nest 11. The bottom of the casing is provided with a central opening 12 leading into the space or chamber within the cylinder 15 and through which opening the piston rod 13 passes. The constricted vent 16 in the outer end of the cylinder provides for the restricted ingress and egress of the air, and as a result, the piston is impeded in its movement which will cause the nest to descend or gravitate within the casing with a slow and gradual movement. In this manner, when the nest is occupied by a hen, the nest will gravitate slowly and gradually to seat on the bottom of the casing, and when the nest is unoccupied or vacated, the same will ascend slowly and gradually. The air in being compressed within the cylinder 15 when the nest is being occupied will serve to cushion the nest, and as the air is permitted to slowly emit through the vent 16, the nest is permitted to descend or gravitate.

A trap door 7 is hinged to the casing 4 at the upper end of the exit 6, this door being held partially open by means of a flexible member or cord 8 secured to the free end of the door and secured to the casing above the exit. This trap door permits the hen to readily vacate the nest through the exit, but prevents the nest from being occupied through the exit. The trap door is held partially open so as to lead the hen to pass through the exit in vacating the nest.

A perch 9 is secured to the casing 4 at the lower end of the entrance 5, the perch being supported by means of brackets or braces 10. This perch serves as a platform for the hen when entering the nest in order that the hen may mount upon the perch 9 and then pass through the entrance 5 to occupy the nest.

A curtain 24 is attached at its ends to the forward edges of the top of the casing and the false top 18, so that when the nest is gravitated, the passage between the top of the casing and the false top 18 will be closed. This curtain 24 when the nest is in raised position will be doubled or folded in order to unencumber the passage into the nest but still partially close the entrance.

In use, the casing 4 is built in a fence F as illustrated in Fig. 1, which fence is employed as a partition for separating two adjoining yards or inclosures. The fence F is merely employed as diagrammatic, it being understood, that the casing 4 may be built in a wall or any other partition separating two inclosures of any sort. The inclosure with which the entrance 5 of the casing communicates is used to contain the various fowls, and it is understood that any number of the nests may be employed, the same being preferably set side to side. The laying hen will then enter the casing 4 through the entrance 5 to occupy the nest, in which event the nest will slowly and gradually gravitate to seat on the bottom of the casing. Particular attention is directed to the fact that the cylinder is of a length slightly longer than the vertical movement of the nest, the piston working within the cylinder at all positions of the nest, so that the nest will be constrained to move at a uniform slow velocity under the various conditions. The slow downward movement of the nest will prevent the hen from being frightened, excited or injured, and should the hen pass her head through the entrance 5 when the nest is descending, her head will not be injured by the downward movement of the false top 18 for the reason that the false top is spaced above the lower end of the entrance 5 when the nest is seated on the bottom of the casing. When the nest has gravitated, the false top 18 closes, or rather partially closes, the passage from the nest through the entrance 5 in order to prevent the hen from vacating the nest through the entrance. The exit 6 is partially open at all times, and the false top 18 being spaced slightly above the entrance 5 when the nest has gravitated, will provide for the proper ventilation of the nest, and when the nest has gravitated, the hen may occupy the nest to the exclusion of the other fowls and without interruption, and may remain in quietude until the egg has been laid. The curtain 24 inclosing the passage between the false top 18 and the top of the casing when the nest has gravitated prevents the entrance of other hens or fowls into the casing above the false top 18, so as not to interfere with the action of the device or the quietude or seclusion of the hen occupying the nest. The canopy 21 also prevents the hen or fowls from mounting on the cable 19 to interfere with the operation of the device or to shake or move the nest. It will therefore follow that when the nest is occupied the hen will not be disturbed, and it will be noted that the curtain 24 serves to close the entrance 5 when the nest has gravitated. After the egg has been laid, the hen may vacate the nest through the exit 6, the hen being led to pass through the exit for the reason that the exit is always partially open, and the trap door 7 being free to swing upward to permit the passage of the hen. After the hen has passed through the exit, the trap door 7 will drop downward to prevent the hen or any other hen from entering the nest. After the nest has been vacated, or is unoccupied, the weight 23 in overbalancing the nest, will cause the nest to ascend to the normal raised position. This slow ascension of the nest will prevent the egg from being broken, and will also prevent the nest from rising rapidly to catch the hen as the hen is vacating the nest.

In the manner described, as the hens occupy the nest to lay the eggs, the hens are collected in the yard or inclosure adjacent the yard or inclosure containing the mixed fowls, and as a result the nesting hens may be detected and segregated from the others. This will assist in replacing the non-laying hens by working hens, in order that the husbandry of the poultry yard may be brought to the highest possible standard, avoiding lazy hens, or hens which do not lay.

This device is simple, durable, and inexpensive in construction, and may be readily repaired when necessary. This device also operates in a simple and effective manner so as not to frighten, excite or injure the hens, and permits the hens to remain in quietude and seclusion when laying.

It is understood that the various parts of this device may be constructed of any suitable materials, and that the proportions or dimensions of the various details may be altered at will, and that this device is further susceptible of alterations or deviations in its details within the scope of the appended claim without departing from the spirit of this invention.

Having thus described the invention, what is claimed as new is:—

A trap hen's nest comprising a casing having an upper entrance and a lower exit, a nest slidable vertically in the casing, means for raising the nest when unoccupied, a cylinder secured to one end of the casing and having a constricted vent, a piston in the cylinder, and a piston rod connecting the cylinder and nest, the cylinder being of a length longer than the vertical movement of the nest and the piston working snugly within the cylinder at all positions of the nest, so that the nest will be constrained to move at a uniform slow velocity.

In testimony that I claim the foregoing as my own, I have hereto affixed my signature in the presence of two witnesses.

RICHARD S. BLEVANS.

Witnesses:
  E. E. MERRIS,
  B. A. GATES.